(12) United States Patent
Brebant et al.

(10) Patent No.: US 11,303,050 B2
(45) Date of Patent: Apr. 12, 2022

(54) ELECTRIC CONNECTION PLUG FOR A BATTERY MODULE AND CORRESPONDING CABLING KIT

(71) Applicant: E-XTEQ Europe, Saint-Germain-de-la-Grange (FR)

(72) Inventors: Morgan Brebant, Gambias (FR); Justin Yu, Les-Clayes-Sous-Bois (FR); Pierre Pailhas, Les-Clayes-Sous-Bois (FR); Philippe Fonteneau, Les-Clayes-Sous-Bois (FR)

(73) Assignee: E-XTEQ Europe, Saint-Germain-de-la-Grange (FR)

( * ) Notice: Subject to any disclaimer, the term of this patent is extended or adjusted under 35 U.S.C. 154(b) by 0 days.

(21) Appl. No.: 17/056,164

(22) PCT Filed: May 17, 2019

(86) PCT No.: PCT/EP2019/062762
§ 371 (c)(1),
(2) Date: Nov. 17, 2020

(87) PCT Pub. No.: WO2019/219893
PCT Pub. Date: Nov. 21, 2019

(65) Prior Publication Data
US 2021/0218164 A1   Jul. 15, 2021

(30) Foreign Application Priority Data

May 18, 2018   (FR) ....................................... 1854203
Sep. 25, 2018   (FR) ....................................... 1858738

(51) Int. Cl.
*H01R 11/28*  (2006.01)
*H01M 50/569*  (2021.01)
(Continued)

(52) U.S. Cl.
CPC ........ *H01R 11/282* (2013.01); *H01M 10/446* (2013.01); *H01M 50/569* (2021.01);
(Continued)

(58) Field of Classification Search
CPC ......................... H01R 11/282; H01R 2101/00; H01R 11/286; H01R 24/005; H01M 2220/20; H01M 50/569; H01M 10/446
See application file for complete search history.

(56) References Cited

U.S. PATENT DOCUMENTS 7,029,338 B1 *   4/2006   Orange ................. H01R 4/5008
                                                                  439/755
10,381,752 B2 *  8/2019   Kaehny .................... H01R 11/11
(Continued)

FOREIGN PATENT DOCUMENTS

CN            1960029 A      5/2007
CN          204538142 U      8/2015
(Continued)

*Primary Examiner* — Jean F Duverne
(74) *Attorney, Agent, or Firm* — Young Basile Hanlon & MacFarlane, P.C.

(57) ABSTRACT

An electric connection plug (5, 5', 5") for an electric cable (3) for use with an electric terminal (20, 21, 20', 21') of a battery module (2, 2'). The plug includes a conductive fitting (51, 51', 51") engaged with a rotatable wheel (56, 56', 56") for selectively rotating the fitting to threadingly mechanically and electrically connect to plug to the battery terminal. The cable mechanically and electrically connects to the plug allowing rotation of the wheel and fitting without rotation of the cable while threadingly engaging and disengaging the plug to the battery terminal.

17 Claims, 4 Drawing Sheets

(51) Int. Cl.
   *H01M 10/44* (2006.01)
   *H01R 24/00* (2011.01)
   *H01R 101/00* (2006.01)

(52) U.S. Cl.
   CPC ......... *H01R 11/286* (2013.01); *H01R 24/005* (2013.01); *H01M 2220/20* (2013.01); *H01R 2101/00* (2013.01)

(56) References Cited

U.S. PATENT DOCUMENTS

| | | |
|---|---|---|
| 2014/0217978 A1 | 8/2014 | Gellert |
| 2015/0140872 A1* | 5/2015 | Orange ................ H01R 11/282 439/762 |
| 2016/0121735 A1 | 5/2016 | Sugano |

FOREIGN PATENT DOCUMENTS

| | | |
|---|---|---|
| CN | 205304311 U | 6/2016 |
| CN | 206789718 U | 12/2017 |
| EP | 2979918 A1 | 2/2016 |
| WO | 0169726 A1 | 9/2001 |

* cited by examiner

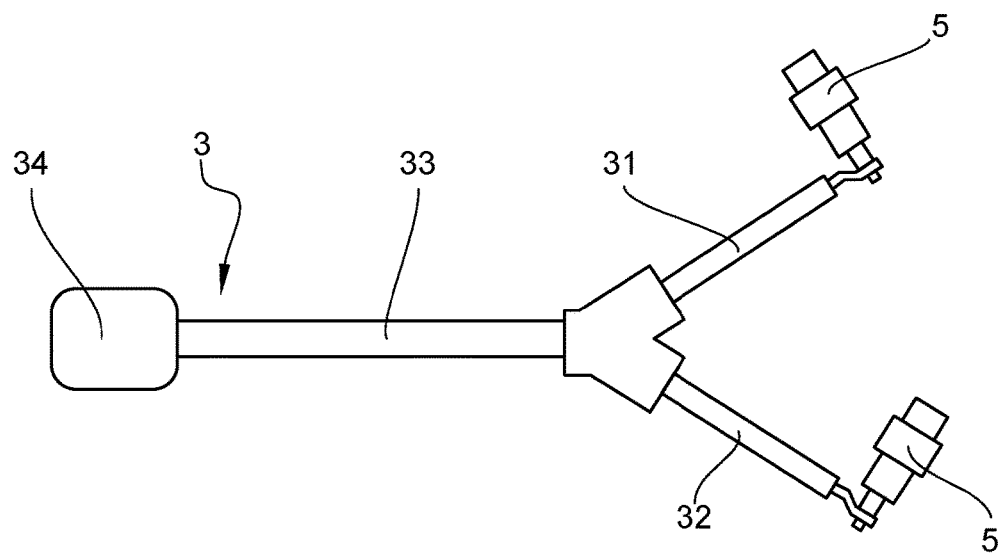
Fig. 4
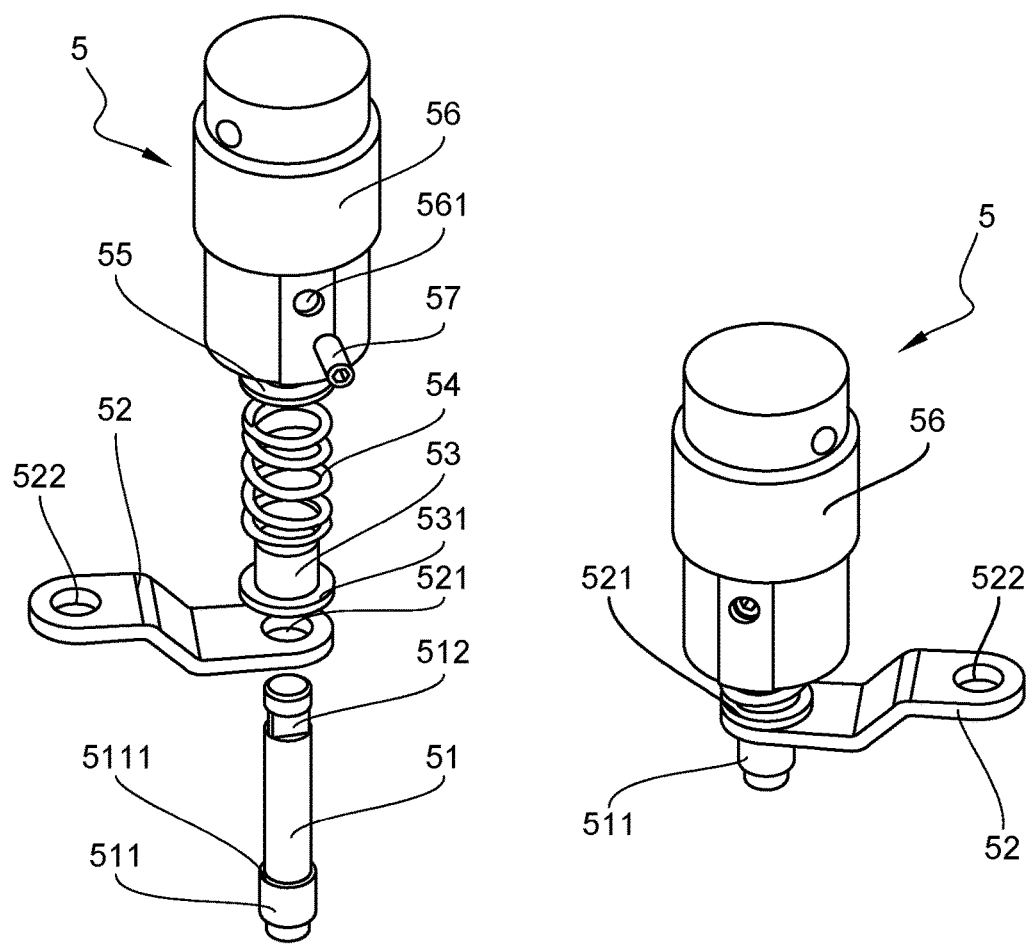
Fig. 5
Fig. 6

ELECTRIC CONNECTION PLUG FOR A BATTERY MODULE AND CORRESPONDING CABLING KIT

CROSS-REFERENCE TO RELATED APPLICATIONS

This application claims priority benefit to PCT Application No. PCT/EP2019/062762 filed May 17, 2019 which claims priority benefit to French Patent Application No. 1854203 filed May 18, 2018 and French Patent Application No. 1858738 filed Sep. 25, 2018, the entire contents of all applications incorporated herein by reference.

TECHNICAL FIELD

The invention relates to the field of electric batteries of motor vehicles.

More precisely, the invention relates in particular to the field of electric connection for the maintenance of electric batteries.

The invention relates specifically to the connection used for the levelisation of the electric charge of a battery module in a battery pack, typically on multi-use reversible connection means, usable in particular for the charging and/or the discharging of a battery, in particular with the goal of levelising the electric charge of a battery module in a battery pack, for example when this module replaces a defective battery module.

The invention can be generalised to other situations in which there is a need to ensure electric connections allowing the circulation of charging current to a battery, and more particularly when these connections are temporary, for operations of initial charging, monitoring and/or maintenance.

BACKGROUND

Hybrid and electric vehicles arouse great interest and are currently developed more and more by motor vehicle manufacturers.

These vehicles implement a battery pack generally composed of several battery modules juxtaposed and connected to each other in a protective case.

Each module comprises a certain number of cells for storing electric energy, or "electric cells", adjoining and connected to each other, which can have a cylindrical, prismatic, or pouch shape (pouch cell).

Moreover, in the module, the electric cells, which are generally mounted in series, are accessible individually via control circuits—typically simple cabling—comprising in particular the possibility of measuring their individual charge voltage, as well as, in certain cases, other parameters of each cell and of each module, such as their temperature.

Over the life of a battery pack, it can happen that a module becomes defective: in this case, it is necessary to extract it from the battery pack and replace it with a new module to ensure the operation of the battery.

However, during its installation, the new module can have a charge level, or electric voltage, different from the other modules of the battery pack, which is not desirable, since this causes a non-homogenous level of wear and discharge rate in the battery pack.

The electric voltage of this new module must thus be levelised with respect to the electric voltage of the other modules of the battery pack, so as to have an equivalent charge level.

In practice, the module must be subjected to an operation of differential charging or discharging, in order to re-establish a uniform charge level in the various modules.

The levelisation of the charge of a module out of a series of modules of a battery pack can also be carried out on a non-defective module having a level of charge and/or of voltage different from the other modules, without this module necessarily being replaced.

The electric cells that compose the module must thus be controlled electronically in order to determine whether the desired charge level has been reached.

In order to carry out the operations of charge levelisation and charge monitoring, it is necessary to use a station for charge monitoring and levelisation of the modules (module balancer), to which the module can be connected.

In order to carry out the levelisation of charge, a Y-shaped charge-levelising cable with three branches, or "two-in-one" cable, is typically used between the module and the station for charge monitoring and levelisation.

Moreover, in order to carry out the verification and the electronic monitoring of the charge state of the electric cells, an electronic monitoring cable is conventionally used between the module and the station for charge monitoring and levelisation.

Thus, as illustrated in FIG. 1, a facility for monitoring and for levelising module charge comprises at least one battery module 2, coming from a battery pack 100, connected to a station 1 for charge monitoring and levelisation via two cables, a first cable, called cable 3 for charge levelisation, and a second cable, called electronic monitoring cable 4.

A station for charge monitoring and levelisation conventionally includes a connection interface, illustrated in FIG. 3, having on the one hand at least a first charging connector 10 intended to cooperate with an end of a first branch of the cable 3 for charge levelisation, more precisely the leg of the Y, and on the other hand at least a second connector 11 intended to cooperate with an end of the electronic monitoring cable 4.

As for the battery module, it includes on the one hand two charging terminals 20, 21, positive and negative, illustrated in FIG. 2 intended to cooperate with the ends of the two other branches of the cable 3 for charge levelisation, and on the other hand an electronic monitoring connector 22 intended to cooperate with the end of the electronic monitoring cable 4.

The module 2 illustrated in FIG. 2 is only an example of a battery module. There are numerous types of modules, designed by various motor vehicle manufacturers, which can be very different from one another, but which always have both at least two charging terminals and at least one electronic monitoring connector.

The charging terminals 20, 21 of a module are generally in the form of threaded orifices or of threaded rods.

As for the branches of the cable 3 for charge levelisation, they generally have a threaded end (and respectively with an inner thread), so as to be mechanically and electrically secured, reversibly, by begin screwed to the complementary parts (with an inner thread and/or screwed) of the charging terminals 20, 21.

However, this screwing operation conventionally leads to an internal twisting of the cable, which can over time damage the electric wires, and compromise the operation of levelising the charge of the battery module.

There is therefore a need to provide a technical solution that allows an operator to screw the ends of the branches of the cable, without any twisting internal to the cable being created.

SUMMARY

For this purpose, the invention proposes a plug for electric connection of an electric cable to an electric terminal of a battery module comprising:

on the one hand a conductive fitting comprising at a first end means for mechanical and electric connection to said terminal and being provided at a second end with a wheel for actuating said fitting in rotation, and on the other hand, a conductive element for connection of said electric cable, provided with means for mechanically and electrically securing said conductive element to said electric cable, for example at a first end of said conductive element, and provided with means for mechanical and electric connection to said fitting, for example at the second end of said conductive element, providing freedom of rotation of said fitting with respect to said cable or to the conductive element connected to said cable.

The securing/disconnection of said means for connecting said plug to said terminal is carried out by a movement of rotation imparted by means of said wheel, without rotating at least a part of the conductive element for connecting said electric cable and/or to said cable.

The rotation of the assembly formed by the actuation wheel and the fitting allows the fitting and the terminal of the battery module to be mechanically and electrically linked, in a reversible manner. The fact that the cable is maintained by an element capable of rotating about the fitting allows, when the actuation wheel is rotated, for the element for connecting the cable, and consequently the cable itself, to remain immobile with respect to the fitting. Thus, the invention allows the situation of the twisting of the cable during its fastening to the electric terminal and consequently risking the rupture of the electric wires of the cable to be avoided.

According to another aspect of the invention, said electric connection plug comprises elastic return means exerting a force of extension in the axial direction of said fitting so as to place said means for connecting said fitting to the terminal under tension, while exerting a friction stress tending to prevent the rotation of said conductive element for connecting said electric cable with respect to said fitting.

Said wheel is designed to allow a movement of rotation of said fitting with respect to said conductive element by exerting a force of rotation greater than said forces of friction.

When the connection plug is "at rest", that is to say when it is not manipulated by an operator for its mounting on a battery module (and respectively disassembly), the elastic return means allow on the one hand the mechanical and electric connection to remain firmly between the fitting, more generally the connection plug, and the electric terminal of the module in order for the electric and mechanical contact to be well ensured, and on the other hand with respect to the fitting, via a force of friction, the element for connecting the cable to remain stationary, in order for it to not be able to freely rotate about said terminal during the operations of charge levelisation of the module, which could hurt the operator or hamper the manoeuvres.

When the connection plug is "in use", that is to say mounted (and respectively disassembled) by an operator on the battery module, the latter conjointly rotates the wheel and the fitting by compressing the spring in such a way that the force of friction is overcome: the assembly formed by the fitting and the wheel can thus be pivoted without the element for connecting the cable being rotated in turn.

The latter, and consequently the cable, thus remains immobile with respect to the fitting. This arrangement also allows the connection plug to be rigidified, which facilitates the operation of screwing with one hand by an operator.

According to another aspect of the invention, said elastic return means consist of a helical return spring mounted with pressure around the fitting between said wheel and said conductive element.

According to another aspect of the invention, said second end of said conductive element is mounted around the fitting between said helical spring and a stop formed between the first and second ends of the fitting.

The return means exert a thrust on the element for connecting the cable which is pushed against the stop in such a way as to ensure the electric contact. Moreover, the connection element is thus pressed against the stop, which creates the force of friction that allows it to be prevented from pivoting around the fitting when the connection plug is "at rest".

According to another aspect of the invention, said means for connecting the fitting to said terminal comprise a thread at said first end of said fitting capable of cooperating with a complementary inner thread arranged at said terminal.

In this case, said means for connecting said fitting to said terminal can comprise a fastening of the bayonet type or a fastening by plugging of the fitting into or onto said terminal then locking with a screwed cover placed around said fitting.

According to an alternative of the invention, said means for connecting the fitting to said terminal comprise an inner thread at an end (for example the first end) of said fitting capable of cooperating with a complementary thread made at said terminal, said fitting being secured to said terminal by screwing onto said terminal.

The connection of the fitting to the terminal is thus carried out by screwing of the fitting with respect to the electric terminal. The end of the fitting can be threaded, if the terminal has an inner thread. The end of the fitting can have a threaded orifice, if the terminal has a threaded rod.

According to another aspect of the invention, said wheel can be disconnected from said fitting, and the surface of the fitting (in particular at the second end) comprises at least one flat section, intended to cooperate with the end of at least one blocking part screwed into said wheel.

In this case, said fitting can comprise a pin forming the second end of said fitting, said helical return spring being mounted with pressure around the pin, the pin including said at least one flat section, intended to cooperate with the end of at least one blocking part screwed into said wheel.

The assembly consisting of the flat section and the blocking part forms a system for securing the wheel to the fitting that is simple and not costly to produce.

According to another aspect of the invention, the outer surface of said wheel has gripping irregularities, such as ribbing or equivalent.

This makes the wheel more ergonomic and facilitates the gripping by the operator.

According to another aspect of the invention, said conductive element for connecting the cable comprises a tab including a first orifice for connection to said cable, in said first end of said conductive element, and a second orifice for connection to said fitting, in said second end of said conductive element.

The second orifice for connection to said fitting can, according to one embodiment of the invention, be connected to said pin.

According to another aspect of the invention, the fitting comprises at least one intermediate part and a contact part, said parts being configured to cooperate with a cable lug and with a battery terminal.

The invention thus also relates to a plug for electric connection of an electric cable to an electric terminal of a battery module, comprising:
- a conductive fitting comprising at least two distinct parts, one end of which has means for mechanical and electric connection to said electric terminal, and one end of which has a wheel for actuating in rotation at least one of the parts of said fitting and
- a conductive element for connecting said electric cable, provided with means for mechanically and electrically securing said conductive element to said electric cable, and provided with means for mechanical and electric connection to said fitting providing freedom of rotation of at least a part of the fitting with respect to said cable (in particular to the lug of said cable), the securing/disconnection of said means for connecting said plug to said terminal being carried out by a movement of rotation imparted by means of said wheel, without rotating said electric cable and/or the conductive element for connection to said cable.

According to a possible feature of the invention, said fitting comprises a rod, an intermediate part and/or a contact part.

According to another possible feature, the means for mechanical and electric connection to said electric terminal are formed by the rod or the contact part.

According to another possible feature, the wheel is mounted on the intermediate part.

According to another possible feature, the means for mechanically and electrically securing said conductive element to said electric cable are formed either by the intermediate part and the contact part, or by the intermediate part, the contact part and the rod.

According to another possible feature, the intermediate part and the contact part are configured to cooperate with a cable lug and with a battery terminal.

According to another possible feature, there is a wheel above the rod.

According to another possible feature, the rod, the intermediate part and/or the contact part are made from an electrically conducive material.

According to another possible feature, the contact part comprises a central part, substantially cylindrical, configured for a cable lug, in the mounted position, to surround said central part (said lug being able to rotate about the central part until the contact part has been placed in contact with said terminal of the battery).

According to another possible feature, the intermediate part has a through-hole opening into a retaining groove, the contact part having a crown configured to be inserted into said retaining groove.

The retaining groove thus limits the travel of the contact part along the longitudinal axis of the fitting.

According to another possible feature, the intermediate part and the contact part are configured to be driven in rotation conjointly by means of the wheel (for example by means of shapes, such as flat sections, disposed on each of the parts cooperating with one another).

According to another possible feature, the rotation of the intermediate and contact parts, by means of the wheel, fastens (or secures) the lug of the cable against the inter-mediate part and the contact part (in particular against the lower end of the intermediate part and against a flange of the contact part).

The invention also relates to a charging cabling kit for a battery module comprising a set of at least two charging electric cables, each provided with an electric connection plug as described above.

BRIEF DESCRIPTION OF THE DRAWINGS

Other features and advantages will be clearer upon reading the following detailed description of specific embodiments of the invention, given as simple illustrative and non-limiting examples, and the appended drawings, in which:

FIG. 4 illustrates a cable for charge levelisation in the shape of a Y, comprising a main branch intended to be connected to the charging connector of the station and two secondary cable branches intended to be connected to the electric terminals of the module by means of a connection plug according to the invention;

FIG. 5 is an exploded view of a connection plug according to the invention;

FIG. 6 is a view of the connection plug of FIG. 5, assembled;

DETAILED DESCRIPTION

Figure 1:
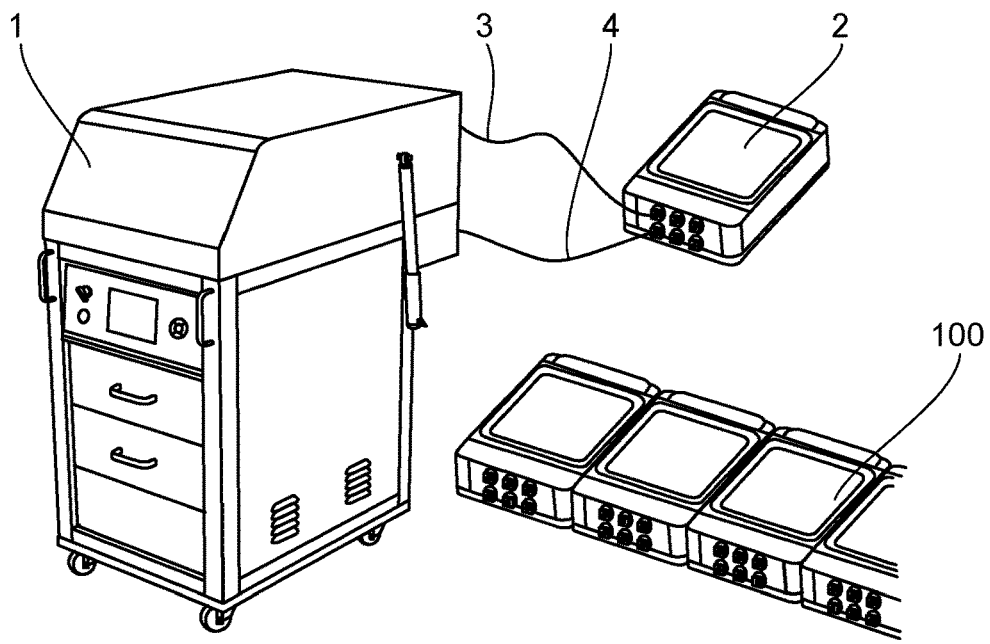
FIG. 1 illustrates a station for monitoring and for levelising the charge of a battery module connected to a battery module by means of a first cable for charge levelisation, and a second cable for electronic monitoring of the charge.

The invention thus proposes a technical solution simple to implement allowing the twisting of the end of the cable for charge levelisation to be avoided during its installation on the terminals of the module.

To do this, the invention proposes implementing a plug for electric connection between an electric terminal of the battery module and the end of the cable for charge levelisation, which has a fitting that the operator can rotate in such a way as to secure it to the terminal, without the cable being driven in rotation.

For this, an element to which the cable is secured is mounted free in rotation about the fitting, in such a way that the cable for charge levelisation fastened onto this maintaining element remains immobile when the fitting carries out a movement of rotation.

FIG. 4 illustrates a substantially Y-shaped cable 3 for charge levelisation, called "two-in-one cable".

This cable 3 for charge levelisation is indeed formed by two cables 31, 32 respectively forming the two branches of the Y, grouped together inside a sheath in such a way as to form a third branch 33.

The end of the third branch 33 includes a connector 34 intended to cooperate with the charging connector 10 of the station 1 for charge monitoring and levelisation.

The end of the two branches 31, 32 is intended to be connected to two electric terminals 20, 21, respectively positive and negative, of a battery module, the charge level of which, in other words the voltage, must be modified.

For this, the end of each of the two branches 31, 32 is secured to an electric connection plug 5, mounted, in particular screwed, onto the battery module 2, allowing the cable 3 for charge levelisation and the battery module 2 to be electrically connected.

This electric connection plug 5 is described below, in relation to FIGS. 5 and 6.

It includes a fitting 51, which is in this embodiment a main rod 51, the lower end of which is intended to be connected to the terminal 20, 21 of a battery module.

The rod, or at least its lower part, consists of a conductive material, the electric contact between the rod and the terminal of the module being generally ensured by the screwing threads and/or by an annular surface for bearing of the rod on a complementary receiving surface of the terminal of the battery module.

Figure 2:
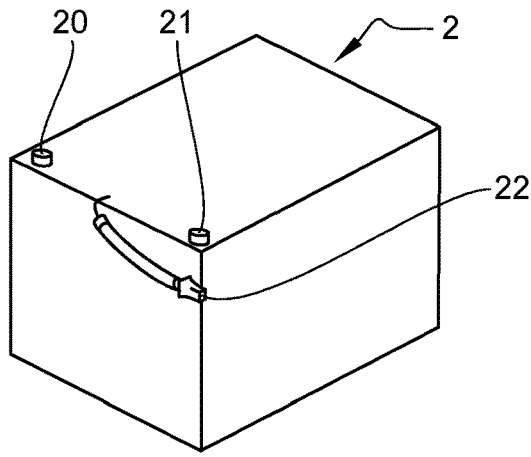
FIG. 2 illustrates an example of a battery module, comprising on the one hand two electric charging terminals and on the other hand an electronic monitoring connector.
Figure 3:
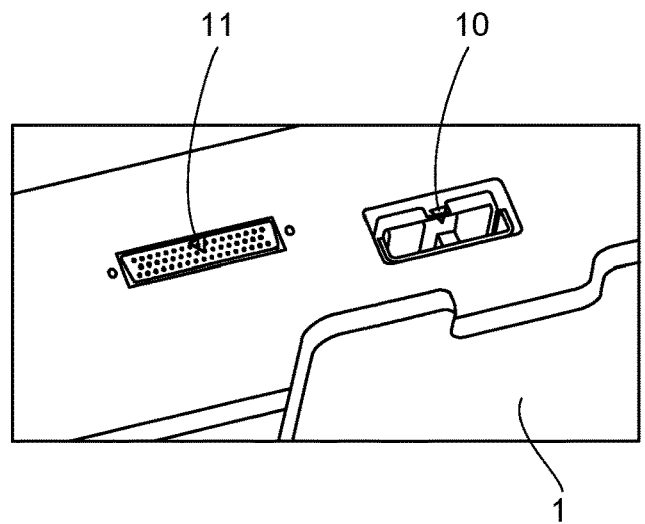
FIG. 3 illustrates the interface of a station for charge monitoring and levelisation, comprising at least one charging connector dedicated to the levelising of charge and at least one connector dedicated to the electronic monitoring.

The lower end of the rod 51 has for this purpose an extra thickness 511, the peripheral surface of which is threaded (not shown), this thread being intended to cooperate with an inner thread provided in an orifice forming the electric terminal 20, 21 of the battery module as shown in FIG. 2.

In the case in which the electric terminal 20, 21 of the module is in the form of a threaded rod, the lower end of the rod 51 can have a threaded orifice (second embodiment).

Any other type of fastening in rotation, involving even a slight rotation of the rod, can be used in the context of the invention. For example, the fastening between the rod 51 and the terminal 20, 21 can be of the bayonet type.

The terminal 20, 21 of the battery module, whether it is male (second embodiment) or female (first embodiment), can also have a tapered shape onto which the rod 51 is plugged, the tightening being ensured by a screwed cover.

As for the upper end of the rod 51, it has three flat sections 512 facing each other, formed regularly on its contour.

This upper end of the rod 51 is inserted inside a wheel 56, or a knob, having an orifice having a complementary shape.

The head of the wheel 56 (or top portion of the wheel) is illustrated with a circular shape, but could take on other shapes, for example parallelepipedic.

In its circular version, the outer surface of the head of the wheel is advantageously provided with ribbing, with flutes, or with any other type of surface modelling, in regular or irregular shape, allowing to facilitate the gripping and the manoeuvring by the user.

The body of the wheel 56 (located under the head of the wheel) is provided with three piercings 561 (only one of which is shown), regularly distributed on its periphery, which coincide with the positioning of the flat sections 512 of the top end of the rod 51.

Three flat-bottom screws 57 thus allow the wheel 56 and the rod 51 to be secured.

According to another specific embodiment, the wheel is made of an insulating material, for example a plastic and/or macromolecular material, overmoulded in engagement with asperities or fins made in—or added onto—the upper end of the rod.

The wheel 56 forms a handle for the operator. When it is actuated in rotation, during the mounting of the electric connection plug 5 on the battery module 2, it drives the rod 51 in rotation which, cooperating in rotation with the terminal 20, 21 of the battery module, is screwed (respectively unscrewed when the wheel is turned in the reverse direction with a view to disassembling the connection plug).

Moreover, a tab 52, or tongue, made of copper is mounted free in rotation around the rod 1.

Having a substantially elongated shape, it has at one of its ends a first orifice 521 into which the rod 51 is inserted, and at the other of its ends a second orifice 522 where the cable 3 for charge levelisation is secured.

More precisely, the cable 3 for charge levelisation ends in a clamp made of a conductive material which is secured to the tab 52 by means of a screw inserted into the orifice 522. In order to guarantee both the mechanical securing and the electric connection, the two parts (cable and tab) are advantageously welded or brazed to one another, according to the nature of their respective conductive materials, while respecting the compatibilities between materials.

As illustrated in FIGS. 5 and 6, the tab 52 has a Z-shaped profile, the two orifices 521, 522 and the tab portion 52 thus being positioned according to parallel planes, slightly at a distance from one another.

The tab 52 is naturally positioned by one of its faces, at the orifice 521, against the rim 5111 of the extra thickness 511 formed at the bottom of the rod 51, which thus forms a stop.

In order for a permanent contact to be maintained between the tab 52 and the rim 5111, a pressure spring 54, preferably helical, is mounted around the rod, above the tab 52.

In the assembled configuration (FIG. 6) of the electric connection plug 5, the spring 54 is slightly compressed.

Consequently, the tab 52 is compressed between the rim 5111 of the lower end of the rod 51 and the spring 54.

A guide washer 53 and a flat washer 55 are mounted on either side of the spring 54, around the rod 51.

The guide washer 53 substantially forms a tube provided with a flange 531 oriented towards the tab 52, and acts as a "sacrificial part": the flange 531 indeed offers a direct-contact surface for the spring 54, which allows to avoid any damage to the tab 52 made of copper, which is a more fragile and abradable material.

The pressure spring 54 has several functions.

It allows first of all to press the tab 52 against the stop of the rod 51, by means of the washer 53, which creates between the washer 53, the tab 52 and the rod 51 a force of friction such that the tab 52 is immobilised when the electric connection plug 5 is not manipulated by an operator, in other words "at rest". Thus, the tab 52 is not liable to rotate freely about the rod, which could bother the operator during the operation of charge levelisation of the battery module, or even hurt the operator.

Moreover, it allows, when the connection plug 5 is mounted on the battery module ("at rest" configuration), a force of extension to be produced, in the axial direction of the rod 51 in such a way as to place under tension the zone for connection between the rod 51 and the terminal 20, 21. In this way, the possible risks of unscrewing of the rod 51 with respect to the terminal 20, 21 are minimised.

Finally, this extension force inside the electric connection plug 5 prevents any undesirable rotation of the wheel 56 with respect to the rod 51, coming from a possible play between these two elements, which rigidifies the electric connection plug 5 and thus facilitates the operation of screwing with only one hand.

When the connection plug 5 is mounted in the terminal 20, 21 of the module, there is, through the cable 3 for charge levelisation, a circulation of electric current from the monitoring and levelising station 1 towards the module 2, and vice versa, allowing the charge level of the module to be regulated.

In order to mount the connection plug 5 on the battery module (and respectively disassemble it), the operator exerts a pressure on the wheel 56 while pivoting it.

In this configuration "of use" of the connection plug 5, the movement of rotation of the assembly formed by the wheel 56 and the rod 51 generates a force greater than the force of friction maintaining the tab 52 stationary around the rod 51.

This has the effect that the rod 51 rotates (in such a way as to be screwed or unscrewed in or on the terminal of the module) without the cable, with the tab 52 being now stationary, being itself subject to a rotation.

This consequently allows the cable 3 for charge levelisation to not be subjected to a twisting during its electric plugging onto the terminal 20, 21.

The connection plug 5 can be provided to operators in a charging cabling kit for a battery module comprising a set of at least two cables 3 for charge levelisation each provided with an electric connection plug 5.

Of course, the technical solution proposed is not limited to the embodiment described above and is provided only as an example. It encompasses various modifications, alternative forms and other alternatives that a person skilled in the art could imagine in the context of the issue posed.

Figure 7:
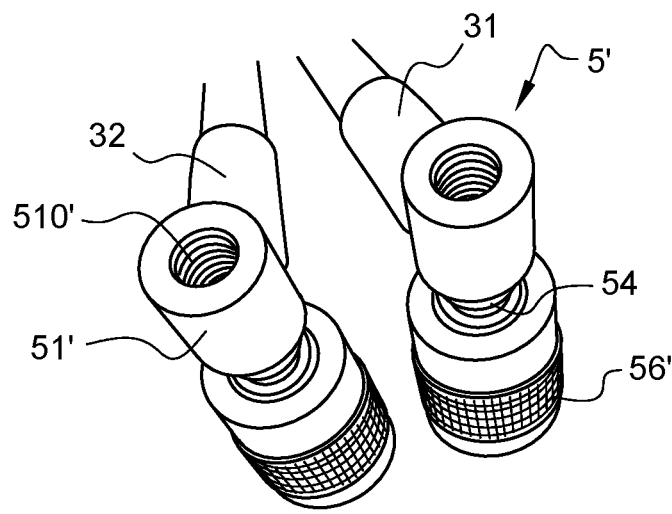
FIG. 7 is a view of the connection plug according to a second embodiment of the invention.
Figure 8:
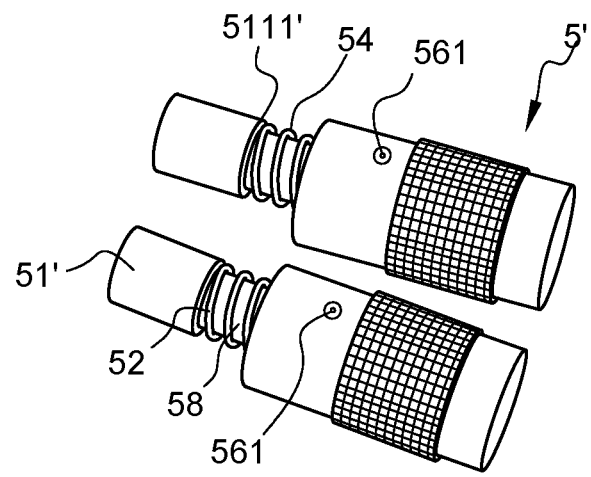
FIG. 8 is a side view of the connection plug according to the second embodiment of the invention.
Figure 9:
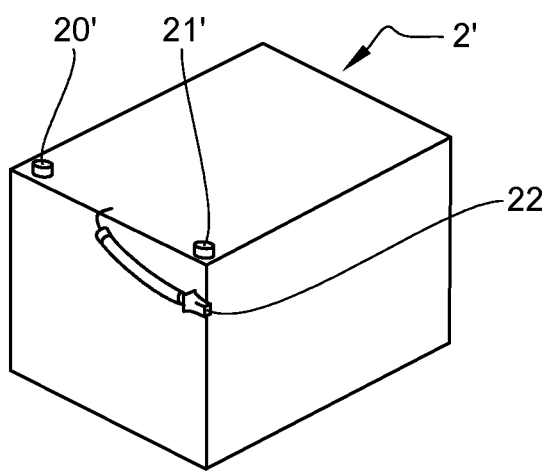
FIG. 9 illustrates an example of a battery module, comprising on the one hand two electric charging terminals and on the other hand an electronic monitoring connector, according to a second embodiment, adapted for the connection plugs of FIGS. 7 and 8.

In this second embodiment shown in FIGS. 7-9, the battery module 2', the charge level of which must be modified, has two terminals 20', 21' threaded on their contour. Such a battery module 2' is illustrated in FIG. 9.

Thus, to connect the two branches 31, 32 of the cable 3 for charge levelisation to these two "male" terminals 20', 21', the end of each of the two branches 31, 32 is secured to a "female" electric connection plug 5', mounted, in particular screwed, onto the battery module 2', allowing to electrically link the cable 3 for charge levelisation and the battery module 2'.

This electric connection plug 5' is described below, in relation to FIGS. 7 and 8.

It includes a fitting 51', the lower end of which is intended to be connected to the terminal 20', 21' of a battery module.

This lower end has an inner thread 510'.

More particularly, the lower end can be connected to the terminal 20', 21' of a battery module 2' by screwing.

In other words, the means for connecting the fitting 51' to the terminal 20', 21' comprises an inner thread at the first end of the fitting 51' capable of cooperating with a complementary thread made at the terminal 20', 21'.

In this embodiment, the fitting 51' is thus secured by screwing onto the terminal 20', 21'.

The fitting 51', or at least its lower part (corresponding in particular to the first end), consists of a conductive material, the electric contract between the fitting and the terminal of the module being generally ensured by the screwing threads (or thread) and/or by an annular surface for bearing of the fitting on a complementary receiving surface of the terminal of the battery module.

The terminal 20', 21' of the battery module has a threaded rod, which can have a cylindrical shape onto which the fitting 51' is plugged, the tightening being ensured by a screwed cover.

The terminal 20', 21' of the battery module can also have a tapered shape, the tightening also being ensured by a screwed cover.

The upper end, or second end, of the fitting 51' is formed by a pin 58.

This pin 58 can, according to the embodiment illustrated, comprise three flat sections (not illustrated in FIGS. 7 and 8) facing each other, formed regularly on the contour of the pin 58.

This pin 58 is inserted inside a wheel 56', or a knob, having an orifice having a complementary shape.

The head of the wheel 56' (or top portion of the wheel) is illustrated with a circular shape, but could take on other shapes, for example parallelepipedic.

In its circular version, the outer surface of the head of the wheel is advantageously provided with ribbing, with flutes, or with any other type of surface modelling, in regular or irregular shape, allowing to facilitate the gripping and the manoeuvring by the user.

The body of the wheel 56 (located under the head of the wheel) is provided with three piercings 561 (only one of which is shown), regularly distributed on its periphery, which coincide with the positioning of the flat sections of the pin 58 forming the second end of the fitting 51'.

Three flat-bottom screws, similar to the flat-bottom screws of the first embodiment, thus allowing the wheel 56 and the fitting 51' to be secured (via the pin 58).

According to another specific embodiment, the wheel is made of an insulating material, for example a plastic and/or macromolecular material, overmoulded in engagement with asperities or fins made in—or added onto—the upper end of the fitting 51', that is to say onto the pin 58.

The wheel 56 forms a handle for the operator. When it is actuated in rotation, during the mounting of the electric connection plug 5' on the battery module 2', it drives the fitting 51' in rotation which, cooperating in rotation with the terminal 20', 21' of the battery module, is screwed (respectively unscrewed when the wheel is turned in the reverse direction with a view to disassembling the connection plug).

Moreover, a tab 52, or tongue similar to the first embodiment (not shown in FIGS. 7-8), made of copper is mounted free in rotation around the fitting 51'.

Having a substantially elongated shape, it has at one of its ends a first orifice into which the pin 58 is inserted, and at the other of its ends a second orifice where the cable for charge levelisation is secured.

Like for the first embodiment, the tab 52 has a Z-shaped profile, the two orifices and the tab 52 portion thus being positioned according to parallel planes, slightly at a distance from one another.

The tab 52 is naturally positioned by one of its faces, at the orifice, against the rim 5111' of the extra thickness formed between the first and the second end of the fitting 51'.

In order for a permanent contact to be maintained between the tab 52 and the rim 5111', a pressure spring 54, preferably helical, is mounted around the pin 58, above the tab 52.

When these elements are assembled, as illustrated in FIGS. 7 and 8, the spring 54 is slightly compressed.

Consequently, the tab 52 is compressed between the rim 5111' of the fitting 51' and the spring 54.

A guide washer (not shown) and a flat washer (not shown), similar to those implemented in the first embodiment, can be mounted on either side of the spring 54, around the fitting 51'.

The pressure spring 54 has several functions.

It allows first of all to press the tab 52 against the stop or rim 5111' of the fitting 51', by means of the washer, which creates between the tab and the fitting a force of friction such that the tab 52 is immobilised when the electric connection plug connection plug 5' is not manipulated by an operator, in other words "at rest". Thus, the tab 52 is not liable to rotate freely about the rod, which could bother the operator during the operation of charge levelisation of the module 2', or even hurt the operator.

Moreover, it allows, when the connection plug 5' is mounted on the battery module 2' ("at rest" configuration), a force of extension to be produced, in the axial direction of the fitting 51' in such a way as to place the zone for connection between the fitting 51' and the terminal 20', 21' under tension. In this way, the possible risks of disconnection, in particular by unscrewing, of the fitting 51' with respect to the terminal 20', 21' are minimised.

Finally, this extension force inside the electric connection plug 5' prevents any undesirable rotation of the wheel 56 with respect to the fitting 51', coming from a possible play between these two elements, which rigidifies the electric connection plug 5' and thus facilitates the operation of screwing with only one hand.

When the connection plug connection plug 5' is mounted on the terminal 20', 21' of the module, there is, through the cable for charge levelisation, a circulation of electric current from the monitoring and levelising station to the module 2', and vice versa, allowing to regulate the charge level of the module 2'.

In order to mount the connection plug 5' on the battery module (and respectively disassemble it), the operator exerts a pressure on the wheel 56 while pivoting it.

In this configuration "of use" of the connection plug 5', the movement of rotation of the assembly formed by the wheel 56 and the fitting 51' generates a force greater than the force of friction maintaining the tab 52 stationary around the fitting 51'.

This has the effect that the fitting 51' rotates (in such a way as to be screwed or unscrewed in or on the terminal of the module) without the tab 52 maintaining the cable stationary being itself subject to a rotation.

This consequently allows for the cable 3 for charge levelisation to not be subjected to a twisting during its electric plugging onto the terminal 20', 21'.

In this third embodiment, the electric connection plug 5" is described below, in relation to FIGS. 10 and 11.

The connection plug 5" includes a fitting 51", the lower end of which is intended to be connected to a terminal of the female type 20, 21 or of the male type 20' or 21' of a battery module, as well as a wheel 56" mounted on said fitting 51".

This lower end thus has a thread for the female terminals or an inner thread for the male terminals.

The fitting 51" comprises, according to the alternative embodiments of this third embodiment, two or three parts.

Thus, in a first alternative intended to cooperate with battery terminals of the female type 20 or 21, the fitting 51" comprises a rod 51"a, an intermediate part 51"b having a through-hole extending along the height of the part, and a contact part 51"c also having a through hole.

The rod 51"a has an upper end above which there is a wheel 511"a, and is preferably threaded along its entire length, the rod 51"a being inserted through the through-holes of the intermediate 51"b and contact 51"c parts. The through-holes of the intermediate 51"b and/or contact 51"c parts can also have an inner thread or a thread (intended to cooperate with the thread of the rod), the rod 51"a thus being screwed through said parts 51"b and/or 51"c, then into the terminal 20 or 21 of the battery. Thus, the fitting 51" is secured by screwing onto the terminal 20, 21, by means of the rod 51"a. It is noted that in the mounted position, the rod 51"a, the intermediate part 51"b and the contact part 51"c are coaxially disposed with respect to each other.

As for the intermediate 51"b and contact 51"c parts, they cooperate with one another, but also with a lug 31a of the cable 31.

The intermediate part 51"b thus has a substantially cylindrical outer shape with a flat section 512"a extending over at least a part of the height of said part 51"b.

Figure 10:
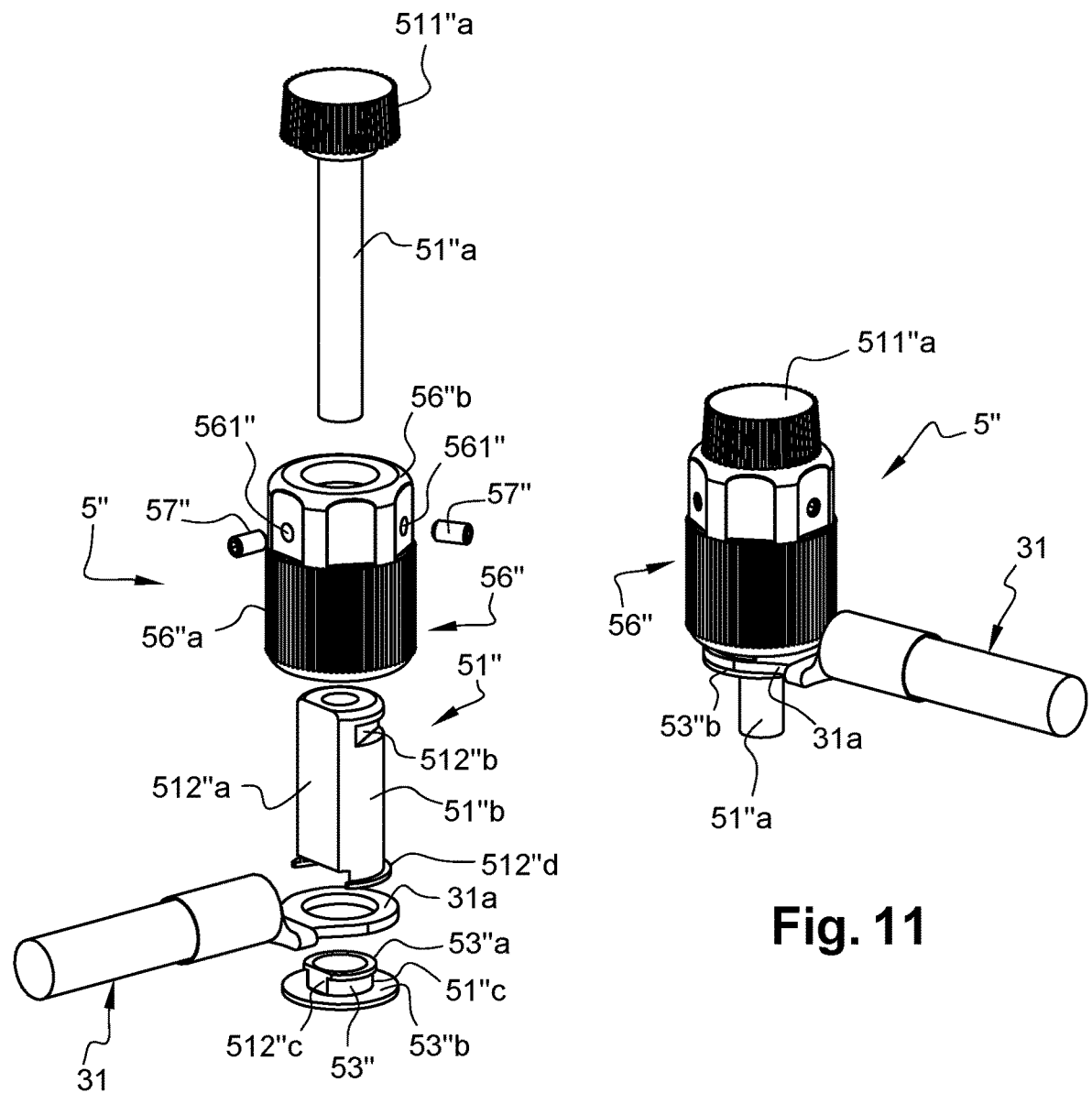
FIG. 10 shows an exploded view of a connection plug according to a third embodiment of the invention.
Figure 11:
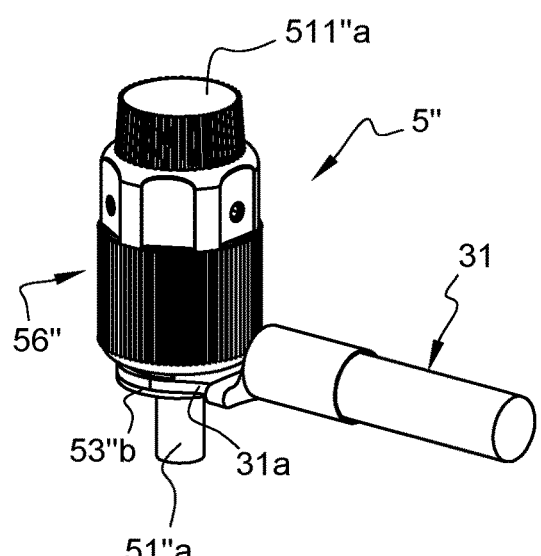
FIG. 11 is a view of the connection plug of FIG. 10 in assembled form.

The intermediate part 51"b also has two opposite ends, one of the ends including two additional flat sections 512"b, while the other end has a wall in which an open retaining groove is arranged (the groove being located on the inner face of this wall, not visible in FIG. 10).

The wheel 56", generally made of plastic material and having a substantially cylindrical shape, covers (or surrounds) the intermediate part 51"b.

The wheel 56" thus also comprises a through-hole having a flat section extending at least over a part of the height of the wheel 56".

The intermediate part 51"b is thus configured to be inserted at least partly into the wheel 56" and for the respective flat sections of said elements to cooperate, thus preventing a rotation of the wheel 56" with respect to the intermediate part 51"b and vice versa (thus in the mounted position, the rotation of the wheel 56" causes a rotation of the intermediate part 51"b). It should be noted that the wheel 56" preferably has two parts, a ribbed/grooved part allowing an operator to rotate said wheel 56" by hand and a hexagonal part for the operator to be able to rotate the wheel via a dedicated tool and precisely control the tightening torque.

Moreover, the wheel 56" comprises piercings 561" arranged to be facing the flat sections 512"a and 512"b of the intermediate part 51"b and allowing fastening means 57", such as flat-bottomed screws, to be inserted to secure the wheel 56" to the intermediate part 51"b. This mounting allows in particular a longitudinal translation of the wheel 56" to be prevented with respect to the intermediate part 51"b.

More particularly, the contact part 51"c comprises a central part 53" having a substantially cylindrical shape, above the opposite ends of which there is respectively a crown 53"a (or retaining protrusion) and a flange 53"b. Moreover, the central part 53" has a flat section 512"c.

The crown 53"a of the contact part 51"c is positioned in the retaining groove of the intermediate part 51"b, thus preventing the longitudinal translation of the contact part 51"c with respect to the intermediate part 51"b (there is however play between the intermediate part and the contact part, as long as the fitting is not positioned in an adequate manner on the terminal of the battery). Moreover, the flat section 512"c of the contact part 51"c, in the mounted position, cooperates with the inner flat section of the wheel 56 preventing the rotation of the contact part 51"c with respect to the wheel 56 (but also with respect to the intermediate part 51"b).

Thus, in the mounted position, the lug 31a of the cable 31 surrounds the central part main body 53" (more particularly the substantially cylindrical part of the main body) and is positioned between the flange 53"b of the contact part 51"c and the crown 53"a of the contact part 51"c.

Thus, when it is desired to secure the connection plug 5" to a terminal of the female type of a battery, the lug 31a is positioned between the intermediate 51"b and contact 51"c parts, the lug 31a is thus substantially mounted free in rotation on the substantially cylindrical part of the central part main body 53" and is blocked in translation by said flange 53"b and the lower part of the intermediate part 51"b.

Then the rod 51"a is inserted, successively, through the wheel 56", the intermediate part 51"b, the lug 31a and the contact part 51"c. The end of the rod 51"a is then fastened by screwing onto the terminal 20 or 21 of the battery, the screwing of the rod 51"a being carried out for example by hand by means of the wheel 511"a.

Then, the intermediate part 51"b (and by extension the contact part 51"c and the lug 31a) is moved (for example by screwing) by acting on the wheel 56" until the flange 53"b is in contact with the terminal 20 or 21 of the battery. In this (final) position, the lug 31a is no longer free in rotation and is in contact with the intermediate 51"b and contact 51"c parts of the fitting 51". More particularly, the intermediate part 51"b comprises, at the end including the retaining groove, a shoulder 512"d (extending towards the exterior of the intermediate part) which thus bears uniformly on the lug 31a and causes a uniform mechanical contact between the lug 31a and the flange 53"b of the contact part 53".

Indeed, the rod 51"a, the intermediate part 51"b and the contact part 51"c are made from an electrically conductive material (such as metal) and it is necessary for the electric contact between the lug 31a of the cable 31 and the element forming the fitting 51" to be as good as possible, in order to not create an additional resistance that can cause the creation of a hot point potentially dangerous to the user of said connection plug.

In the present case, the present invention allows the cable to be oriented easily according to the needs of the user until the screwing of the fitting 51", a simple and easy screwing allowing ensuring a good electrical contact between said plug and the terminal of a battery.

In a not-shown alternative of this third embodiment, the end of the male terminal 20', 21' can also cooperate directly with a complementary thread (or an inner thread) arranged on the inner wall of the through-hole of the intermediate part 51"b. The terminal 20', 21' is inserted through the contact part 51"c and the lug 31a, the wheel 56" being screwed until the blocking of the rotation of the lug 31a located between the contact part 51"c and the intermediate part 51"b. It is noted that in the context of this alternative embodiment, the fitting 51" cannot include the rod 51"a, nevertheless if this is the case, the rod does not necessarily extend until the terminal of the battery (but preferably over a part of the height of the intermediate part 51"b).

In relevant alternative embodiments, there is a wheel, for example made from an electrically insulating material, such as plastic, above the rod, in order for said wheel in the mounted position (that is to say screwed into the intermediate part) to cover the top of the intermediate part thus limiting the access to the metal intermediate part to the user, thus reducing the risks of bad contact, of short circuit, or of an electric shock/electrocution of the user.

In another not-shown alternative, the wheel 56" comprises a stop extending facing the flat section 512"c of the contact part 51"c (said stop being configured to extend through the lug 31a of the cable 31 without hindering the rotation of said lug 31a around the main body 53" of the contact part 53").

The invention claimed is:

1. An electric connection plug for use in electric connection of an electric cable to an electric terminal of a battery module, the connection plug comprising:
   a conductive fitting comprising at a first end means for removable mechanical and electric connecting of the plug to said electric terminal, and at a second end a wheel for actuating said fitting in rotation; and
   a conductive element operable to connect said electric cable to said fitting, the conductive element including means for mechanically and electrically connecting said conductive element to said electric cable, and including means for mechanical and electric connecting to said fitting, said means for connecting operable to allow rotation of said fitting with respect to at least one of said electric cable or to the conductive element connected to said electric cable;
   elastic return means operable to exert a force of extension in an axial direction of said fitting so as to place under tension said means for connecting the plug to the terminal, while exerting a friction force operable to resist the rotation of said conductive element with respect to said fitting, said wheel operable to rotate said fitting with respect to said conductive element on exertion of a force of rotation greater than said friction force,
   wherein said means for removably connecting said plug to said terminal being carried out by a rotation of said wheel, without resulting rotation of at least one of the conductive element or said electric cable.

2. The electric connection plug according to claim 1, wherein said elastic return means comprise a helical return spring mounted around said fitting and axially biased between said wheel and said conductive element.

3. The electric connection plug according to claim 1, wherein said conductive element comprises a tab defining a first orifice for connection to said fitting and a second orifice for connection to said cable.

4. The electric connection plug according to claim 1, wherein said means for connecting said plug to said terminal comprise an outer thread at said first end of said fitting operable to threadingly engage with a complementary inner thread of said terminal.

5. The electric connection plug according to claim 1, wherein said means for connecting said plug to said terminal comprise an inner thread at said first end of said fitting operable to threadingly engage with a complementary outer thread of said terminal.

6. The electric connection plug according to claim 1, wherein said wheel is removably connected to said fitting, and wherein the fitting further comprises at least one flat section operable to cooperate with an end of at least one blocking part screwed into said wheel.

7. The electric connection plug according to claim 2, wherein said fitting comprises a pin forming said second end of said fitting, said helical return spring mounted around said pin and axially biased, said pin including at least one flat section operable to cooperate with an end of at least one blocking part screwed into said wheel.

8. The electric connection plug according to claim 1, wherein an outer surface of said wheel includes gripping irregularities operable to assist gripping of the wheel.

9. The electric connection plug according to claim 1, wherein the fitting further comprises an intermediate part and a contact part, said intermediate and contact parts operable to cooperatingly engage with a cable lug and the electric terminal.

10. A charging cabling kit for a battery module comprising a set of at least two charging electric cables, each cable provided with an electric connection plug according to claim 1.

11. The electric connection plug according to claim 2, wherein said conductive element comprises a tab defining a first orifice for connection to said fitting and a second orifice for connection to said cable.

12. The electric connection plug according to claim 3, wherein said means for connecting said plug to said terminal comprise an outer thread at said first end of said fitting operable to threadingly engage with a complementary inner thread of said terminal.

13. The electric connection plug according to claim 3, wherein said means for connecting said plug to said terminal comprise an inner thread at said first end of said fitting operable to threadingly engage with a complementary outer thread of said terminal.

14. An electric connection plug for use in electric connection of an electric cable to a battery module terminal, the plug comprising:
- a conductive fitting operable to engage the battery terminal to communicate electricity between the battery terminal and the plug, the fitting having a first end operable to engage the battery terminal and a second end;
- a rotatable wheel engaged to the fitting second end for selectively rotating the fitting about an axis of rotation to engage the battery terminal;
- an axial biasing member positioned between the wheel and the fitting operable to axially bias the wheel away from the fitting along the axis of rotation; and
- one of a conductive tab or cable lug positioned at least partially around and in engagement with the fitting, the conductive tab or cable lug operable to communicate electricity between the plug and the electric cable, wherein on rotation of the wheel and fitting about the axis of rotation, the conductive tab or the cable lug remains substantially rotationally stationary thereby allowing the electric cable to remain substantially rotationally stationary about the axis of rotation.

15. The plug of claim 14 wherein the axial biasing member is a coil compression spring.

16. The plug of claim 15 wherein the one of the conductive tab or the cable lug comprises the conductive tab, the conductive tab further comprising:
- a conductive plate having a first end defining a first through orifice and a second end defining a second through orifice, the first end and the first orifice positioned coaxially around the fitting allowing rotation of the fitting relative to the plate about the axis of rotation while maintaining electrical conductive engagement with the fitting, the second end and the second orifice operable to connect the plate to the electric cable.

17. The plug of claim 14 wherein the one of the conductive tab or the cable lug comprises the cable lug, wherein the fitting further comprises:
- an intermediate part having a through bore along the axis of rotation; and
- a rotatable terminal wheel including an elongate rod having a first end, the rod positioned coaxially within and extending through the wheel, the intermediate part and the cable lug, the terminal wheel selectively rotatable about the axis of rotation operable to engage the rod first end to the battery terminal while allowing the cable lug and the electric cable to maintain substantially rotationally stationary about the axis of rotation.

\* \* \* \* \*